(12) United States Patent
Weber et al.

(10) Patent No.: US 7,574,399 B2
(45) Date of Patent: Aug. 11, 2009

(54) HEDGING EXCHANGE TRADED MUTUAL FUNDS OR OTHER PORTFOLIO BASKET PRODUCTS

(75) Inventors: Clifford J. Weber, Basking Ridge, NJ (US); Carol Alexander, Purley (GB); Charles A. Baker, Wayne, PA (US); Jason MacQueen, New York, NY (US); Gary L. Gastineau, Short Hills, NJ (US); Terry Norman, Barling Magna (GB)

(73) Assignee: NYSE Alternext US LLC, New York, NY (US)

( * ) Notice: Subject to any disclaimer, the term of this patent is extended or adjusted under 35 U.S.C. 154(b) by 70 days.

(21) Appl. No.: 11/974,468

(22) Filed: Oct. 12, 2007

(65) Prior Publication Data

US 2008/0040258 A1 Feb. 14, 2008

(51) Int. Cl.
*G06Q 40/00* (2006.01)
(52) U.S. Cl. ....................................................... 705/37
(58) Field of Classification Search .................... 705/37
See application file for complete search history.

(56) References Cited

U.S. PATENT DOCUMENTS

| | | | | |
|---|---|---|---|---|
| 5,121,337 A | * | 6/1992 | Brown | 702/28 |
| 5,214,579 A | | 5/1993 | Wolfberg et al. | |
| 5,658,423 A | * | 8/1997 | Angell et al. | 438/9 |
| 5,765,165 A | | 6/1998 | Harper | |
| 5,799,287 A | * | 8/1998 | Dembo | 705/36 R |
| 5,806,048 A | * | 9/1998 | Kiron et al. | 705/36 R |
| 5,873,071 A | | 2/1999 | Ferstenberg et al. | |
| 5,875,437 A | | 2/1999 | Atkins | |
| 5,930,762 A | | 7/1999 | Masch | |
| 5,937,159 A | | 8/1999 | Meyers et al. | |
| 5,987,435 A | | 11/1999 | Weiss et al. | |
| 6,003,018 A | | 12/1999 | Michaud et al. | |
| 6,047,270 A | | 4/2000 | Joao et al. | |
| 6,061,662 A | | 5/2000 | Makivic | |
| 6,061,663 A | | 5/2000 | Bloom et al. | |
| 6,088,685 A | | 7/2000 | Kiron et al. | |
| 6,108,648 A | | 8/2000 | Lakshmi et al. | |

(Continued)

FOREIGN PATENT DOCUMENTS

EP 0 434 877 A1 7/1991

(Continued)

OTHER PUBLICATIONS

Greene, Andrew: New Products: Amex plans active exchange-traded fund, Aug. 21, 2000, Investment Management Weekly. New York, p. 1.*

(Continued)

*Primary Examiner*—Hani Kazimi
*Assistant Examiner*—Bijendra K Shrestha
(74) *Attorney, Agent, or Firm*—Howrey LLP

(57) ABSTRACT

A system for pricing and/or determining a basket of financial instruments for hedging investment risk in actively managed traded funds is described. The system uses a trusted computer system and includes a computer storage medium storing a computer program product. The product determines a basket of hedging instruments by applying statistical or economic based factor analysis to estimate the NAV or provide a hedging basket to track actual NAV of an actively managed traded fund.

16 Claims, 11 Drawing Sheets

U.S. PATENT DOCUMENTS

| | | | |
|---|---|---|---|
| 6,111,255 A * | 8/2000 | Malins | 250/339.12 |
| 6,205,439 B1 | 3/2001 | Gardner | |
| 6,244,986 B1 | 6/2001 | Mori et al. | |
| 6,275,814 B1 | 8/2001 | Giansante et al. | |
| 6,304,858 B1 | 10/2001 | Mosler et al. | |
| 6,317,728 B1 | 11/2001 | Kane | |
| 6,321,212 B1 * | 11/2001 | Lange | 705/36 R |
| 6,360,210 B1 * | 3/2002 | Wallman | 705/36 R |
| 6,377,907 B1 | 4/2002 | Waclawski | |
| 6,456,982 B1 | 9/2002 | Pilipovic | |
| 6,584,502 B1 | 6/2003 | Natarajan et al. | |
| 6,606,615 B1 | 8/2003 | Jennings et al. | |
| 6,832,210 B1 | 12/2004 | Li | |
| 7,085,738 B2 | 8/2006 | Tarrant | |
| 7,103,569 B1 * | 9/2006 | Groveman et al. | 705/35 |
| 7,349,878 B1 | 3/2008 | Makivic | |
| 2002/0007329 A1 | 1/2002 | Alcaly et al. | |
| 2002/0091616 A1 | 7/2002 | Bloom et al. | |
| 2002/0099640 A1 | 7/2002 | Lange | |
| 2002/0120542 A1 * | 8/2002 | Higgins | 705/36 |
| 2002/0178111 A1 * | 11/2002 | Woodley | 705/38 |
| 2002/0184126 A1 | 12/2002 | McIntyre, Jr. et al. | |
| 2003/0014343 A1 | 1/2003 | Jones | |
| 2003/0065602 A1 | 4/2003 | Yip | |
| 2003/0126062 A1 | 7/2003 | Gilbert et al. | |
| 2003/0129993 A1 | 7/2003 | Overy et al. | |
| 2003/0139993 A1 * | 7/2003 | Feuerverger | 705/36 |
| 2003/0144947 A1 | 7/2003 | Payne | |
| 2003/0177084 A1 | 9/2003 | Cassani et al. | |
| 2004/0044505 A1 | 3/2004 | Horwitz | |
| 2004/0049448 A1 | 3/2004 | Glickman | |
| 2004/0059621 A1 | 3/2004 | Jameson | |
| 2004/0215551 A1 | 10/2004 | Eder | |
| 2005/0027634 A1 | 2/2005 | Gershon | |
| 2005/0108134 A1 | 5/2005 | Harlow et al. | |

FOREIGN PATENT DOCUMENTS

| | | |
|---|---|---|
| WO | WO 96/18963 | 6/1996 |
| WO | WO 01/03046 | 11/2001 |
| WO | WO 02/084435 | 10/2002 |
| WO | WO 02/091109 | 11/2002 |
| WO | WO 03/001325 | 3/2003 |
| WO | WO 03/036533 | 5/2003 |
| WO | WO 03/083616 | 10/2003 |

OTHER PUBLICATIONS

Hoffman, D: A solution in a search of a problem? Advisors shug at Amex's plan to develop actively managed ETFs, Jul. 12, 2004, Investment News, pp. 1-5.*

Thomson Media Inc.: Actively Managed ETFs on Horizon, Jun. 28, 2004, Securities Industry News, pp. 1-4.*

Pauta et al.: SEC proposes new rules 6C-11 under Investment Company Act of 1940 to create cetain exemption for exchange traded securities, Bulletin 08-055, Mar. 2008, ReedSmith, pp. 1-5.*

Principal Component Estimators in Regression Analysis, Cheng D.C. and Iglarsh, H.J.; The Review of Economics and Statistics, 58(2), May 1976, pp. 229-234.

On Portfolio Optimization: Forecasting Covariances and Choosing the Risk Mode, Chan, L. et al.; The Review of Financial Studies, 12(5), Winter 1999, pp. 937-974.

"Market Models: A Guide to Financial Data Analysis," C. Alexander, Wileys, 2001, pp. 143-178.

"A Test for the Number of Factors in an Approximate Factor Model," *Journal of Finance 48*, (1993), pp. 1263-1292.

"A Test of the Multi-Factor Asset Pricing Model with the ASA-NBER Macroeconomic Forcasts;" Cheong; *Dissertation*, State University of New York at Albany, 1988.

"Active ETF Inching Toward Reality," T. Laswing, Ignites.com, Jun. 10, 2004.

"Actively Managed ETFs on Horizon," I. Clary, Securities Industry News, Jun. 28, 2004, Copyright © Thomson Media Inc.

"An Exploratory Investigation of the Firm Size Effect," Chen et al., *Journal of Financial Economics 14* (1985), pp. 451-471.

"Blind Bids Become Popular in Big Trades," Grep Ip, *Wall Street Journal*, Aug. 14, 1997.

"Common Factors in Security Returns: Microeconomic Determinants and Macroeconomic Correlates," by Barr Rosenberg et al., Institute of Business and Economic Research, University of California, Berkeley, Working Paper No. 44, May 13-14, 1976, pp. 1-55.

"Common Principal Components and Related Multivariate Models," Bernhard Flury, *Department of Mathematics, Indiana University*, Bloomington, Indiana, Copyright 1988 by John Wiley & Sons, Inc.; pp. 1-258.

"Common Risk Factors in the Returns of Stocks and Bonds," E.F. Fama et al., *Journal of Financial Economists 33* (1993), pp. 3-56.

"Could Exchange Traded Funds Be Right For You?," Ameritrade; Ameritrade Exchange-Traded Funds-ETF Center, pp. 1-2, 2004.

"Explore the Essentials of ETFs," Ameritrade; Ameritrade Exchange-Traded Funds-ETF Center: Education; pp. 1-4, 2004.

"Extra-Market Components of Covariance in Security Returns," B.A. Rosenberg, *Journal of Financial and Quantitative Analysis 9* (1973), 263-274.

"Extra-Market Components of Covariance Among Security Prices," B.A. Rosenberg et al., University of California, Berkeley, Research Program in Finance, Working Paper RPF-013, pp. 1-45, 1973.

"Factor Analysis and Principal Components," by Hans Schneeweiss et al., *Journal of Multivariate Analysis*, vol. 55, pp. 105-124 (1995).

"Getting Personal: Active Filing May Be On Horizon," T Bernard, Dow Jones News Service, Jun. 23, 2004.

"HCM Global Technology Fund Limited: Investment Statement," available at www.Fantasy.co.nz/brokerage/hcm/tech-is.pdf (available in or after Jun. 1, 1999).

"Industry Factors versus Other Factors in Risk Prediction," Jivendra K. Kale et al., Research Program in Finance, Working Paper Series, University of California, Berkeley (Mar. 1991). pp. 1-22.

"International Portfolio Diversification: A Multivariate Analysis for a Group of Latin American Countries," Donald R. Lessard, *The Journal of Finance*, vol. 28, No. 3 (Jun. 1973), pp. 619-633.

MAR Headlines: In Business "Mopex ups ante in ETF patent challenge," Last visited on Apr. 25, 2002.

"Mimicking Portfolios and Exact Arbitrage Pricing," Gur Huberman et al., *The Journal of Finance*, vol. 42, No. 1 (Mar. 1987), pp. 1-9.

"Mutual Fund Performance Evaluation: a Comparison of Benchmark and Benchmark Comparison;" Lehman et al.; *Journal of Finance*, Vo. 2, No. 2, Jun. 1987, pp. 235-238.

"On Lines and Planes of Closest Fit to Systems of Points of Space," K. Pearson, *Philosophical Magazine and Journal of Science*, vol. 2, Sixth Series, Jul.-Dec. 1901, pp. 559-572.

"Principal Blind Bidding In Portfolio Trading," *Traders*, No. 143, vol. 11; pg. NA; ISSN: 0894-7295, Sep. 1998, pp. 1-3.

[Random-bits] Gregory Aharonian on Open end mutual fund securitization process patent; pp. 1-4; last visited Apr. 25, 2002.

"Risk and Return in an Equilibrium Apt," Gregory Connor et al., *Journal of Financial Economics*, 21 *1988) 255-289. North-Holland.

"Science and Technology: Digital Rights and Wrongs," *The Economist*, pp. 75-76, Jul. 17, 1999.

"SEC Concept Release: Actively Managed Exchange-Trade Funds," U.S. Securities and Exchange Commission, http://www.sec.gov/rules/concept/it-25258.htm; last visited on Aug. 24, 2004.

"Sorting Out Risks Using Known APT Factors," M.A. Berry et al., *Financial Analysts Journal* (Mar.-Apr. 1988), pp. 29-42.

"Sources of Over-Performance in Equity Markets: Mean Reversion, Common Trends and Herding," Carol Alexander et al., *ISMA Centre Discussion Papers in Finance DP2003-08*, Oct. 2003, pp. 3-31.

"Stock Market Indices: A Principal Components Analysis," Feeney; Cowles Foundation for Research in Economics at Yale University, Monograph 19, pp. 110-138.

"The Empirical Foundation of the Arbitrage Pricing Theory," B. Lehman et al., *Journal of Financial Economics 21* (1988), pp. 213-254.

"The Relative Importance of Common Factors Across the European Equity Markets," S. Beckers et al., *Journal of Banking and Finance 16* (1992), pp. 75-97.

"The Risk and Return from Factors," Louis K. C. Chan et al., *The Journal of Financial and Quantitative Analysis*, vol. 33, No. 2 (Jun. 1998). pp. 159-188.

"The Three Types of Factor Models: A Comparison of Their Explanatory Power," Gregory Connor, pp. 1-7.

"What's Next for ETFs," Gregg Greenberg, The Street.com, pp. 1-2.

"New Products: Amex plans active exchange-traded fund;" Greene, A.; Aug. 21, 2000, *Investment Management Weekly*, New York, p. 1.

Gopikrishnan, P "Quantifying and Interpreting Collective Behavior in Financial Markets" Physical Review E vol. 64, 035106 (R), pp. 1-4; Published. Aug. 30, 2001.

Elton, et al. "Modern Portfolio Theory, 1950 to date" Journal of Banking & Finance, vol. 21, issues 11-12, Dec. 1997; pp. 1743-1759.

"Vangaurd SEC Exemptive Application" dated Jul. 12, 2000; pp. 1-88.

Communication pursuant to Article 96(2) EPC, dated Apr. 5, 2006.

"The Three Types of Factor Models: A Comparison of Their Explanatory Power," Gregory Connor, pp. 1-7.

"The Arbitrage Pricing Theory and Multifactor Models of Asset Returns," Gregory Connor et al., Sep. 1992, Forthcoming in *Finance Handbook*, pp. 1-94.

\* cited by examiner

HEDGING EXCHANGE TRADED MUTUAL FUNDS OR OTHER PORTFOLIO BASKET PRODUCTS

BACKGROUND

This invention relates to pricing and/or hedging techniques for exchange, market or alternative trading system traded funds or similar basket products.

Exchange traded funds or basket products such as S&P 500 Depository Receipts (SPDRs) are vehicles for holding a basket of securities that can be traded on an exchange or securities market. More specifically, these instruments usually represent an undivided ownership interest in a portfolio of stocks or other securities held by a Trust. The portfolio of stocks is often intended to track the performance of an index like the S&P 500 Index, and therefore seeks to invest substantially all of its assets in the stocks comprising the S&P 500 index, in proportion to the relative weights of stocks in that index. SPDR shares are securities issued by the SPDR Trust and may be traded on a stock exchange or in over the counter transactions.

The intra-day pricing of such securities is determined by supply and demand. Typically, these SPDR fund shares may be created or redeemed at the end of each business day at a net asset value price in so called "creation units". In the case of the SPDRs the creation unit has 50,000 SPDR fund shares. SPDR creation units are created or redeemed at the end of day net asset value through an in-kind transfer of securities corresponding to the S&P 500 index. While the official net asset value (NAV) of the SPDR Trust is only published at the close of every business day, the estimated value of the underlying S&P 500 index and the value of the creation basket are published continuously throughout each trading day. The per SPDR value of the index and/or the creation basket can be devised and distributed electronically to brokers, dealers, and investors throughout the world.

An intra-day value disseminated by the exchange is a real time calculation designed to give an investor a per share price which is very close to what the intraday net asset value would be, if it were calculated. At the end of trading, the intraday approximate calculation and the official NAV should be nearly identical.

Intraday values of exchange traded funds such as SPDRs or the Select Sector SPDRs may be evaluated from the publicly available creation basket or the index on a per share basis throughout the day as if the creation basket or the index were the portfolio of the fund. The calculation is relatively straight forward, since the creation basket composition changes little from day to day unless the index changes. While the fund may contain proportionately a few more shares of one stock and a few less of another stock than would be provided by multiplying the creation basket by the number of creation baskets that constitutes the fund, the calculation is very close to net asset value.

Trading on exchanges such as the America Stock Exchange involves a trader called a specialist. A specialist tries to match buy orders with sell orders in a manner that maintains an orderly market. Often specialists and market makers (who make markets for securities on exchanges or on electronic markets such as The Nasdaq Stock Market and who may have obligations similar to those of the specialists to help maintain an orderly market) will have to take a contrary position to the prevalent position in the market by placing their own capital at risk. In securities markets, during the course of a trading day, there can be a net demand for a security, e.g., an exchange traded fund. Thus, over the course of a trading day, the specialist and any market makers trading the security can be selling more shares of a security than they are buying. In this situation, the specialist might buy components of the fund or derivatives based on the fund or on an underlying index in order to hedge its position. If the specialists and market makers have bought more shares of a security than they have sold, they might sell short components of the fund or associated derivatives to hedge their positions. There are also other types of forums for trading securities such as electronic commerce networks (ECN's) and the like.

SUMMARY

It would be desirable to trade actively managed mutual funds and the like intra-day. With actively managed funds the composition of the fund is generally not known to the market maker, specialist or investors and hence trading of such funds intra-day is difficult since accurate pricing and hedging vehicles are not present. Since there may be no corresponding security or index or alternative fund with which the specialist, market maker or investor can effectively hedge a position, trading in such actively managed funds is more difficult than trading a fund based on a known index. The investment advisor desires to keep the actual holdings of the actively managed fund confidential. This is necessary to insure that others cannot trade against the fund or receive benefits of the fund by mimicking transactions made by the actively managed fund, while avoiding payment of fees to the fund advisor. This lack of transparency in fund holdings makes it extremely difficult for market participants to effectively price and hedge these funds or derivatives based thereon through a portfolio of securities.

Described below are techniques to produce traded actively managed fund products that are bought or sold in a secondary market throughout the day. Currently, Now shares in the actively managed funds are created and existing shares redeemed daily at the close of trading at NAV. These techniques allow the actual holdings of the actively managed fund to remain confidential. The techniques insure that others cannot trade against the fund or receive benefits of the fund by mimicking transactions made by the actively managed fund, while avoiding payment of fees to the fund advisor.

According to an aspect of the present invention, a method of pricing and/or hedging investment risk in actively managed traded funds includes using multi-factor risk models to construct a hedging portfolio for the actively managed traded fund.

According to an additional aspect of the present invention, a method of hedging investment risk in a traded, actively managed fund includes grouping securities into groups of securities for which there is some basis to believe that their prices might move together and for each group performing a principal component analysis (PCA) over some percentage of variation (y %) to arrive at a subset of the principal components as the factors for the particular group. The method further includes estimating factor sensitivities of the subset of factors in each of the groups for a particular actively managed fund in order to estimate the intraday fair value or NAV proxy of the actively managed fund throughout a particular trading day.

According to an additional aspect of the present invention, an actively managed fund that is traded intra-day between buyers and sellers, includes shares or derivative instruments corresponding to an interest in the actively managed fund, with the shares or derivative instruments being traded based on a hedging basket of securities derived by applying a principal component analysis to a group of securities to select a subset of the group and weightings for the subset to account for a percentage of variation (y %) of actively managed fund.

One or more of the following advantages may be provided by one or more of the aspects of the invention.

The specialist and market maker are provided with information that enables them to buy or sell a specially constructed hedging portfolio that behaves in a very similar way to the underlying actively managed fund shares. The specialist and market makers are provided with information that will be helpful in producing a hedging portfolio to help them make markets with narrower spreads with good control of their risks. Also, the investment advisor maintains the confidentiality of its positions, while enabling wider distribution of products to different investors.

The process can be performed for each actively managed fund, for which a traded version of the actively managed fund is to be produced either by virtue of an additional share class, or by creation of a new fund. The statistical analysis captures the correlation structure underlying price movements between the actively managed fund and the groupings of stocks. The statistical factors represent how unidentified factors affect the way in which the price of the actively managed fund portfolio changes during a trading day. Thus, investors, specialists, market makers and other market participants have information that enables them to make decisions on pricing of the traded actively managed fund.

DETAILED DESCRIPTION

Described below are two types of financial vehicles. The first is a conventional actively managed fund. The second type is a traded, actively managed fund. The traded actively managed fund is a tradable counterpart based on the actively managed fund. Unlike the conventional actively managed fund, which is bought and sold at net asset value at the close of trading, the traded actively managed fund is intra-day traded on exchanges, markets, electronic commerce networks, and the like. The prices set for shares in the traded actively managed fund are determined by supply and demand taking into consideration the underlying value of the portfolio of the traded actively managed fund using one of several techniques that will be set out below.

Figure 1:
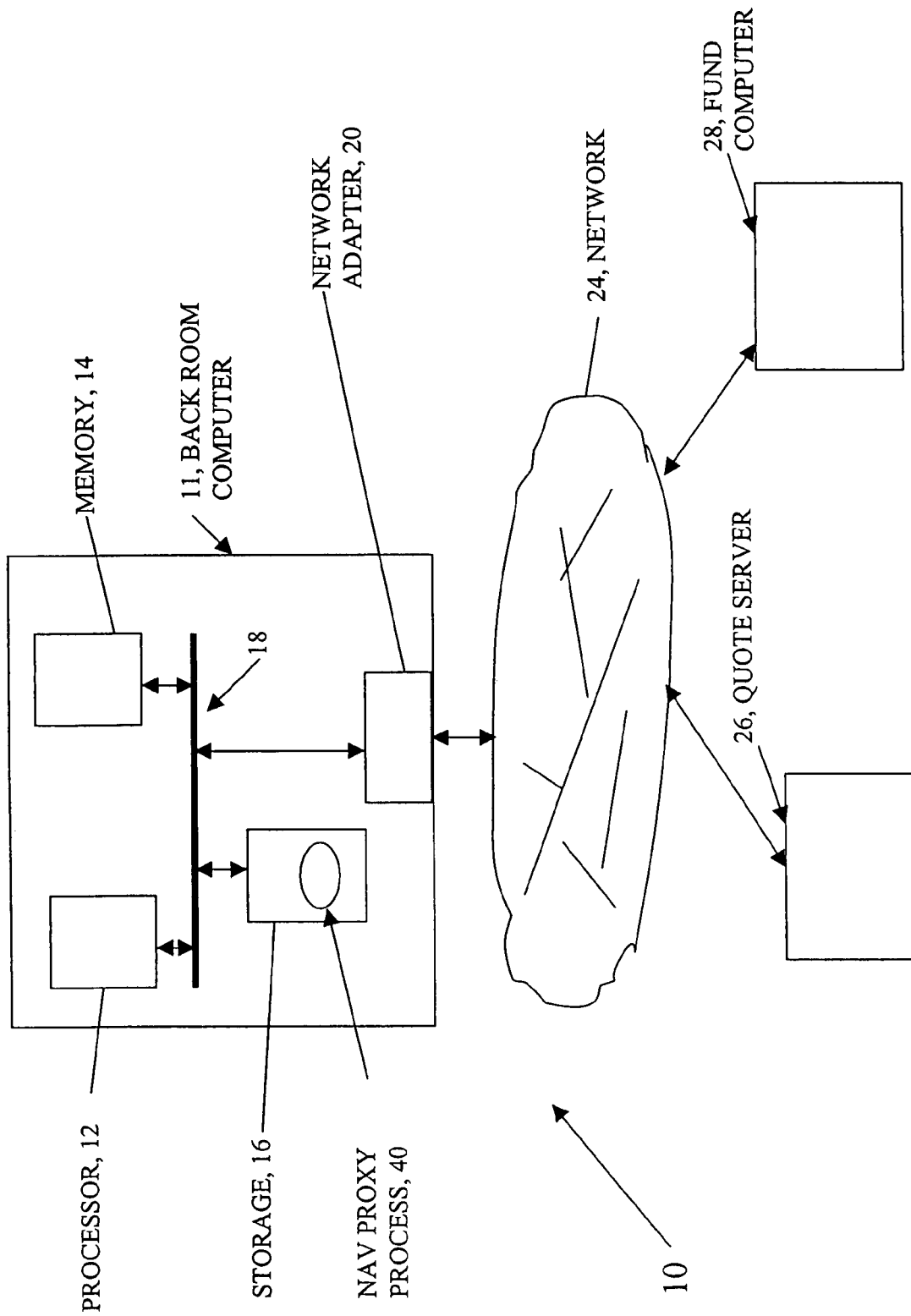
FIG. 1 is a block diagram of a computer system to perform an intra day net asset value proxy calculation.

The traded actively managed fund can be set up as a new class of the actively managed fund. As a new class the shares in the traded actively managed fund could be made fungible with shares of the actively managed fund. Alternatively, the traded actively managed fund can be set up as a separate organization that has a portfolio that follows the general investment philosophy of the actively managed fund, but which is not fungible with the actively managed fund Referring now to FIG. 1, back room operations of an exchange 10, an electronic market, ECN and other types of trading venues, and so forth are shown. The operations 10 include a computer system 11, which includes a CPU 12, main memory 14 and persistent storage device 16 all coupled via a computer bus 18. The computer system 11 may be a server as shown, which is coupled in a network of computers in a conventional manner such as in a client-server arrangement. The details on the client server arrangement are not important to understand the present invention. The computer system 11 can also include output devices (not shown) such as a display and a printer, as well as input user interface devices (not shown) such as a keyboard and a mouse. The computer system 11 also includes a network interface 20 that couples the computer 11 to a network 24. The computer back room operation 10 also receives a quote feed from a quote server 26 and portfolio information from a computer 28 associated with an actively managed fund.

The computer system 10 receives information concerning real-time prices of securities from the quote server 26 and information concerning composition of portfolios from the fund computer 28. The computer system 11 also includes intra-day NAV proxy algorithm software 40 that calculates in real time an intra-day net asset value proxy for a traded actively managed fund. Examples of other products that can use an intra-day NAV calculation can include the value of a spot commodity pool or futures pool; a basket of fixed income instruments chosen for their yields, average maturities, specific durations, the currency in which they are denominated, or for other reasons or characterizations.

Figure 2:
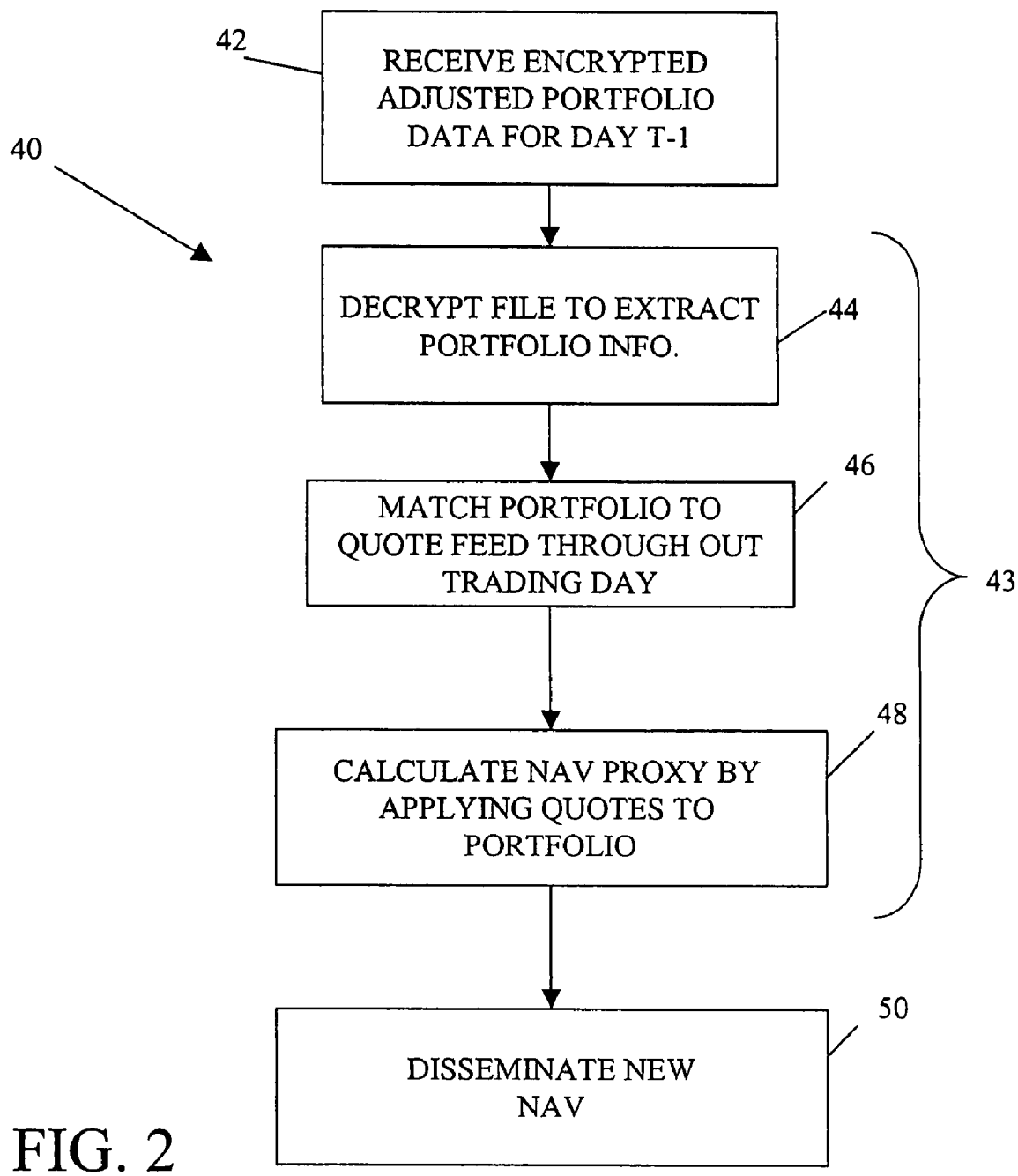
FIG. 2 is a flow chart showing a process to determine an intra-day net asset value proxy of an actively managed fund.

Referring now to FIG. 2, a process 40 to determine an intra-day net asset value proxy is shown. The process 40 can be used to calculate an intra-day NAV proxy for an actively managed portfolio or an enhanced index fund over the course of a trading day. The calculation can be performed in real time. The process 40 will be described in conjunction with a traded actively managed mutual fund. Other actively managed investment vehicles could alternatively be used. Once the closing portfolio is revised for the day's transactions, or more accurately, the next day's opening portfolio on which the intra-day NAV proxy and the official closing NAV will be calculated, has been determined and checked for accuracy, the portfolio is encrypted and transmitted to the intra-day price calculation (42).

The net asset value process 40 receives 42 portfolio information in an encrypted format from the portfolio management organization. This portfolio information has been adjusted to reflect any transactions made on the prior trading day (T−1). Official net asset value calculations that are disseminated to the general media after the close of trading on a current trading day (T) are based on the position of the actively managed fund at the close of the prior trading day (T−1). The net asset value is calculated on current day (T) as if no trades occurred during the trading day. In general, this convention makes little difference in the overall net asset value calculation of the actively managed fund because it is unusual to have a combination of massive turnover on a single day and a significant difference in price at which shares are sold on a current day and the closing price at which the actively managed fund is priced. The portfolio is also adjusted to take into consideration other factors such as dividend credits and expenses attributable to the current day (T). In other embodiments, the actual closing trade date positions of the actively managed fund on the current day can be used in the calculation.

The portfolio information is decrypted 44 and the information is used as the template for intra-day calculations. As a check, a closing price tape identical to the tape used in pricing the basket as of the previous night's close, can be fed to the template to determine if the net asset value calculated against the template is identical to the previous day's closing NAV plus or minus known adjustments. The decrypted portfolio can be re-encrypted using the same or a different encryption process and returned to the portfolio management organization where it will again be decrypted and compared with the file originally sent. This process is used to make sure that the file was not corrupted in the original encryption and transmission process. Other checks are possible including error correction, unauthorized use detection, checksums, etc.

The portfolio information file is encrypted using a public encryption key of a public-private key encryption algorithm with the corresponding private key being only known by the net asset value proxy calculation process 40. The received portfolio data is decrypted in the net asset value proxy calculation process 40 using the corresponding private key. A portion 41 of the process 40 is executed within a so called "trusted system". Trusted systems refer to a physical hardware and operating system configuration in which domain configuration and trust relationships are established to determine access to information on the computer 11.

A trusted computer can have the capability to recognize another trusted system, to execute usage rights (in this case access rights for the portfolio information file) and to render the file so that it cannot be copied or sent in decrypted form outside of the process 40. A highly secure channel can be established between the computer 11 and the actively managed fund computer 28 to enable a transaction where the two trusted systems exchange data over a communication channel, e.g., the Internet or a proprietary network feed, providing assurances to the actively managed fund computer 28 that it is in fact communicating with the exchange back room operation computer 11. Communications over a secure channel can be accomplished with encryption and what are known as challenge-response protocols. Other techniques are possible.

The computer system 11 would have a trusted relationship where a rights or privileges policy is established such that the decrypted portfolio file cannot leave the intra-day net asset value proxy process 40 in a decrypted form. That is, only the intra-day net asset value proxy process 40 itself is given privileges to access the data in the file and no copies can be made of the file. The file may reside in the system throughout trading until replaced with a new file for calculation of intra-day net asset value on the next trading day (T+1). At that time the file can be re-encrypted and returned to the actively managed fund or destroyed.

The process 40 matches 46 quotes from a quote feed to stocks in the portfolio throughout the current trading day (T). The process 40 calculates 48 a new net asset value proxy for the actively managed fund by applying real-time quotes received from the quote server 26 to positions in the actively managed fund portfolio. The process 40 can disseminate 50 a net asset value for a traded actively managed fund on a periodic or continual basis throughout the day.

An alternative would be to have a third party supply the NAV proxy from the portfolio data delivered from a portfolio manager.

Figure 3:
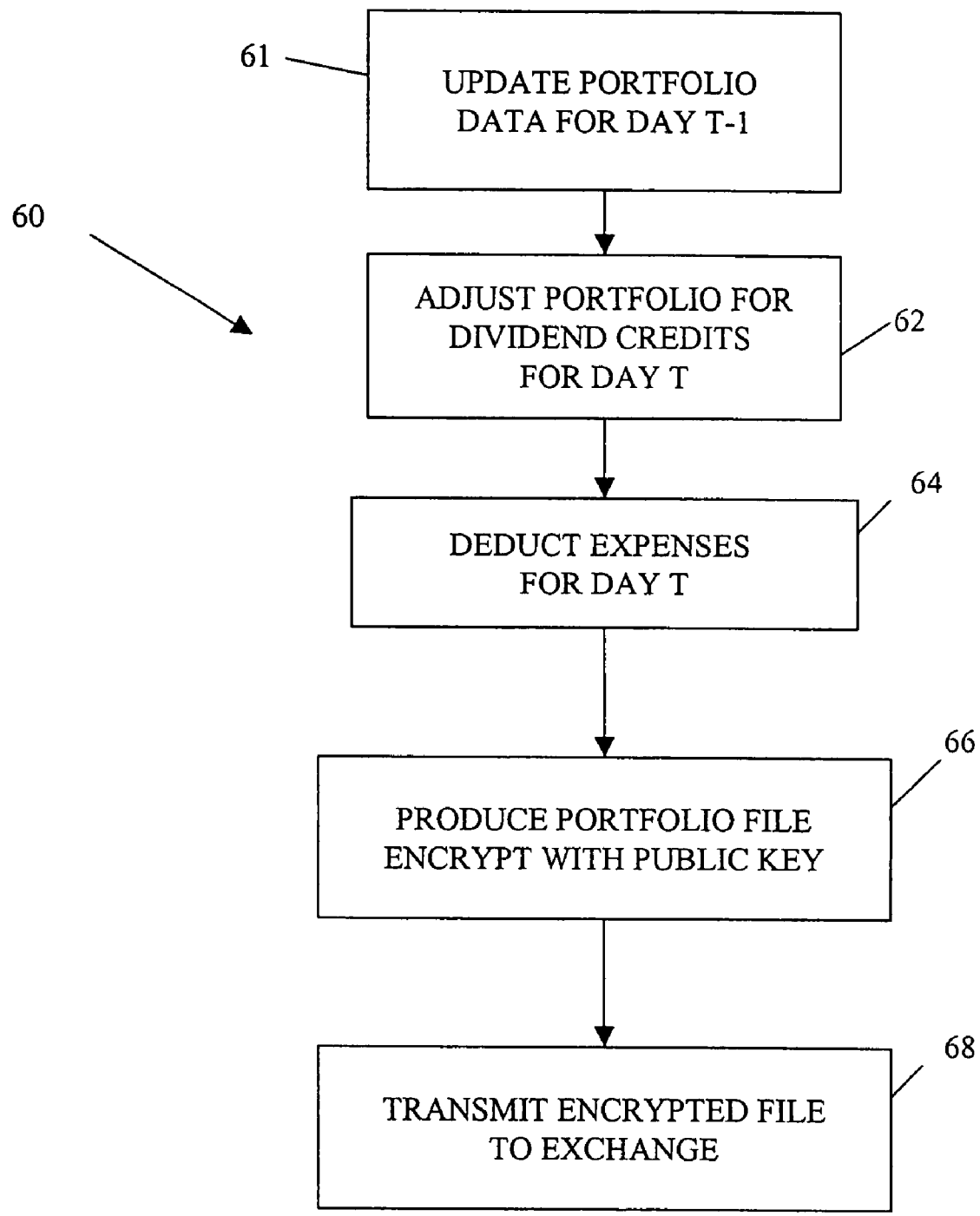
FIG. 3 is a flow chart showing a portfolio adjustment process.

Referring now to FIG. 3, a portfolio adjustment process 60 used to assemble an actively managed fund portfolio to send to the intra-day net asset value calculation process 40 is shown. Portfolio adjustment process 60 adjusts 61 portfolio positions to take into consideration any trading that occurred on the previous trading day (T−1). These positions in the portfolio are further adjusted 62 for dividend credits attributable to day (T), as well as adjusting 64 for any expenses attributable to day (T). Cash positions (not shown) are also taken into consideration. The adjusted portfolio is assembled into a portfolio file and includes additional information such as the total number of shares outstanding for the fund or basket, e.g., to quote vendors, and so forth. The portfolio file is encrypted 66 using the public key of the public-private key algorithm used in the process 40. The portfolio is transmitted 68 to the back room operations 10 of the exchange or market where it is received 42 (FIG. 2) and used as described in conjunction with FIG. 2.

Figure 4:
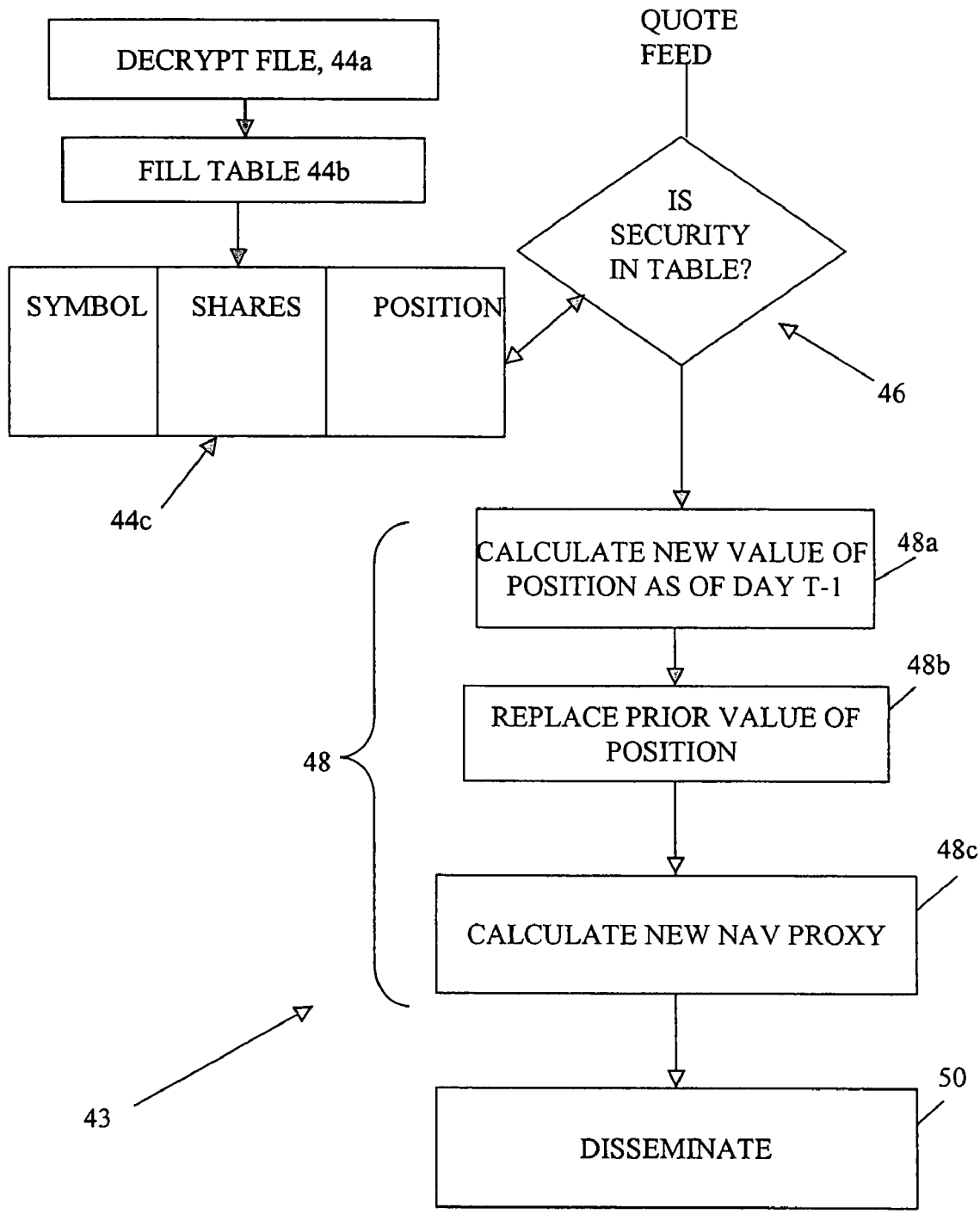
FIG. 4 is a flow chart showing an embodiment of an intra-day valuation process for a traded actively managed fund.

Referring now to FIG. 4, an embodiment of the intra-day valuation proxy process 40 for an actively managed fund is shown. The process 40 decrypts 44a the portfolio file, as received from the fund manager, and populates 44b a table 44c with fund positions. The table 44c can include, for example, security symbols, quantity of shares held and an indication of whether the position in the shares is a "short" position or a "long" position and so forth.

The process 43 continually receives 45 quotes or transaction prices from the trade and quote feeds and determines 46 whether a currently received security and price corresponds to a security in table 44c and thus is a security in the actively managed fund. If the security and price does not correspond to a security in the table, the process waits 47 to examine the next new security and price. Otherwise, the process 40 will calculate 48a a new value of the position (and its bid and offer if the price is a quote rather than a transaction price of the security) as of the trading day by, for example, retrieving the number of shares in the position and multiplying the number of shares by the current quote for the security. This new value will replace 48b, a prior value for the position in that security. The process 43 will calculate 48c, a new net asset value proxy and/or new bid or offer of underlying instruments, by taking the sum of the values of all current positions in the actively managed fund and dividing that by the total number of shares outstanding in the fund.

Another technique that can be used to calculate the net asset value proxy would have the portfolio table 44c include another field that has the value of the position on day (T−1). The table could also have a total of all positions. The net asset value proxy calculation would take the total valuation of the actively managed fund, subtract the old value of the position for a security and add the new value of the position for the security into the total. The new sum would be divided by the number of outstanding shares. The new, net asset value proxy calculation is disseminated 50 through the exchange to quote vendors.

With this intra-day net asset valuation proxy process 40, a stock exchange can calculate in real time, intra-day net asset value proxies for traded actively managed and enhanced index funds. Portfolio managers are assured that the positions of the actively managed fund are not known outside of the actively managed fund so that others, e.g., traders and competitors will not know what securities the actively managed fund is buying and selling. This is important to maintain a fiduciary duty to keep positions confidential where confidentiality is in the interest of the shareholders of the actively managed fund. Thus, this technique assures confidentiality while enabling the system 10 and, the backroom computer 11, to give investors up-to-date, i.e., real time information on valuations to facilitate trading in the mutual fund or trust instrument. Maintaining the confidentiality of this knowledge is important because public dissemination of the information may enable individuals and organizations in effect to trade against the actively managed fund. This confidentiality is assured by encrypting the file and only providing the software with the decryption key to decrypt the portfolio position information in the file.

The portfolio information is only available to the net asset value proxy calculation internal to the computer. The information is either re-encrypted or destroyed so that unauthorized access is prevented. This provides a process for determining an intra-day NAV proxy for traded actively managed or enhanced index funds, which protects the information that the fund manager transmits to the intra-day NAV proxy calculation server.

A real time calculated net asset value proxy disseminated to the market can provide several advantages to the market. The real time calculated net asset value proxy can help establish tight valuation ranges (e.g., lower spreads between bid and ask) which may lead to tight pricing in markets for the basket of securities used to establish the funds. To the extent that trading in the basket would facilitate the formation of more units of the basket, i.e., creation of additional units of traded actively managed fund or additional units of a commodity basket, etc., the cost of maintaining and operating the basket or portfolio would be spread over a larger pool of assets. Consequently, the costs per-dollar of assets in the portfolio or basket might be reduced.

The backroom computer 11 on which the NAV calculation is performed should have appropriate testing procedures for evidence of tampering with software, hardware or data files or access by unauthorized persons to provide a high degree of both physical and data security during the period the decrypted portfolio file is in use in the calculation of intra-day Net Asset Value Proxies. The use of dual processors or systems, for redundancy i.e., fault tolerance, would also be appropriate. In addition to improving reliability, a fault tolerant system can facilitate management of the system if there is a problem in the calculation module. The ordinary steps that the management of a system installation could take to repair hardware or software problems may be rendered more difficult by the encryption-decryption process and by the protections built into the processor. In other words, both the hardware and software may be less accessible than they would be in a normal installation.

Another aspect of the calculation is that it can provide in the context of an actively managed fund bid and offer values and a spread in terms of the fund intra-day NAV proxy. While the calculation generally is comparable in every material respect to the traditional 4:00 P.M. net asset value calculation, it may not be called a NAV calculation when distributed to the market because of the issue of liability for any data or calculation errors and because investors cannot necessarily buy or sell shares from the fund at that price. In addition, 4:00 P.M. closing prices are subject to verifications that may not be practical in an intra-day calculation.

The NAV proxy calculation could be used in a process to provide a hedging portfolio. Alternatively, the calculation used in a hedging portfolio could be provided by the advisor, custodian, fund manager, etc. without encrypting or transmitting any data. Specialists, market makers and other market participants manage their positions over the course of a trading day, generally to maintain either a market neutral or fund share risk neutral position or a specific level of exposure that is independent of supply and demand for the shares they are trading.

In the case of an index fund, the specialist or market maker that sells shares to a public shareholder who comes to the market to buy may, at the same time as the fund share sale occurs, buy stock index futures contracts or an index equivalent basket of stocks or other instruments to maintain a consistent degree of exposure. However, an actively managed or enhanced index fund will not be as readily hedgeable using a single benchmark index/stock index futures contract as an index fund and the contents of the fund may be partly or completely unknown to the specialist or market maker.

Figure 5:
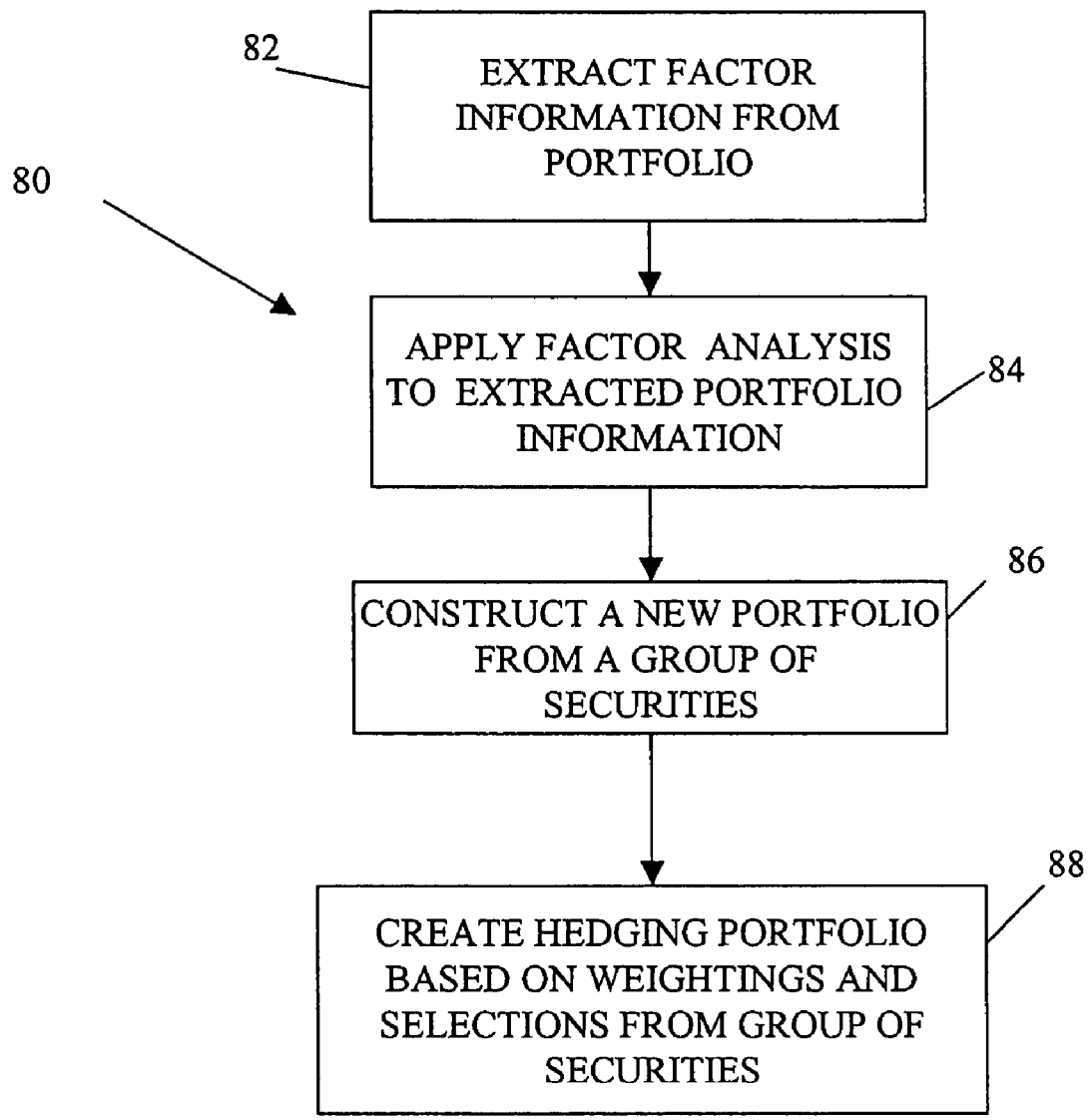
FIG. 5 is a flow chart showing a process for producing a hedging portfolio for a traded actively managed fund.

Referring to FIG. 5, in one embodiment, the specialist does not know what is in the portfolio because the valuation is calculated from encrypted data in the trusted system 41. A hedge creation process 80 sends 82 the portfolio to another trusted process in the computer 11 or to another computer having a trusted process. In any event, the trusted process extracts 82 factor information from the portfolio and applies 84 factor analysis to the extracted portfolio information.

Factor analysis, as described, for example, in the following papers: M. A. Berry, E. Brumeister and M. B. McElroy, "Sorting Out Risks Using Known APT Factors," *Financial Analysts Journal* 44 (1988), 29-42; K. C. Chan, N. F. Chen and D. Hsieh, "An Exploratory Investigation of the Firm Size Effect," *Journal of Financial Economics* 14 (1985), 451-471; B. A. Rosenberg, "Extra-Market Components of Covariance in Security Returns," *Journal of Financial and Quantitative Analysis* 9 (1974), 263-274; S. Beckers, R. Grinold, A. Rudd and D. Stefek, "The Relative Importance of Common Factors Across the European Equity Markets," *Journal of Banking and Finance* 16 (1992), 75-97; J. K. Kale, N. H. Hakansson and W. G. Platt "Industry Factors versus Other Factors in Risk Prediction," working paper, University of California, Berkeley (1991); E. F. Fama and K. R. French, "Common Risk Factors in the Returns of Stocks and Bonds," *Journal of Financial Economics* 33 (1993), 3-56; B. Lehman and D. A. Modest "The Empirical Foundation of the Arbitrage Pricing Theory" *Journal of Financial Economics* 21 (1988), 213-254; and G. Connor and R. A. Korajczyk "A Test for the Number of Factors in an Approximate Factor Model", *Journal of Finance* 48 (1993), 1263-1292, can be used to analyze how various factors have an effect on pricing of the underlying portfolio. These papers are incorporated herein by reference.

The factors that are examined by applying 84 factor analysis include factors such as economic activity, inflation rates, industry membership growth value linked behavior or other factors that are related to measures of security price behavior. For instance, movements of the market might be chosen as a factor, since would have some influence on movement of stocks within the market. Other macroeconomic variables such as inflation rates, interest rate movements, Gross Domestic Product, could also be chosen since they might have influence on security price movements. These are examples of pre-specified factors for use in factor analysis.

As an example, the specialist can be provided with a portfolio of e.g., 100 financial instruments and information of appropriate weightings of each of the instruments. Each of the 100 financial instruments will have distinctive factor characteristics. That is, some of the financial instruments are more interest sensitive, some are more inflation sensitive, some are more sensitive to industrial production, or to any one of a number of other economic and financial market variables.

The process 80 constructs 86 a factor-weighted portfolio by selecting and weighting those 100 instruments based on results of applying 84 factor analysis. Ideally, the factor-based portfolio would be virtually identical in market performance to the traded actively managed fund. The performance expectation would be based on historic relationships, as analyzed by the factor model. The specialist, market makers, and other market participants are given a list of instruments and the proportions of each instrument needed to take risk offsetting positions to hedge any long or short position they may be called upon to take in the shares of the traded actively managed fund. The traders would use that information to create 88 a hedging portfolio.

While the hedging portfolio will not be identical in performance to the actively managed fund nor will it conform as closely to the actively managed fund performance as an index basket or instrument does with a fund based on an index, nevertheless, the hedging portfolio should track the actively managed traded fund portfolio closely enough over the course of a trading day or even a long period of time to protect the trader from major losses. The hedging portfolio would be updated daily to reflect changes in the composition of the fund portfolio. These hedging portfolios need to be liquid so that the specialist can convert the position to cash or some particular portfolio (that can be used as a creation basket for the fund) at the end of the day.

The hedging portfolio can also be used to calculate a Net Asset Valuation proxy much like that described above. However, rather than using actual positions in the actively managed traded fund, the NAV proxy process will use the positions in the hedging portfolio and apply current prices to those positions along with their weightings in the hedging portfolio to determine a NAV proxy value. The hedging portfolio used for NAV proxy purposes need not be identical to the actual hedge portfolio since the hedge portfolio might not take positions in certain securities since there might not be a liquid enough market for the security and so forth.

Figure 6:
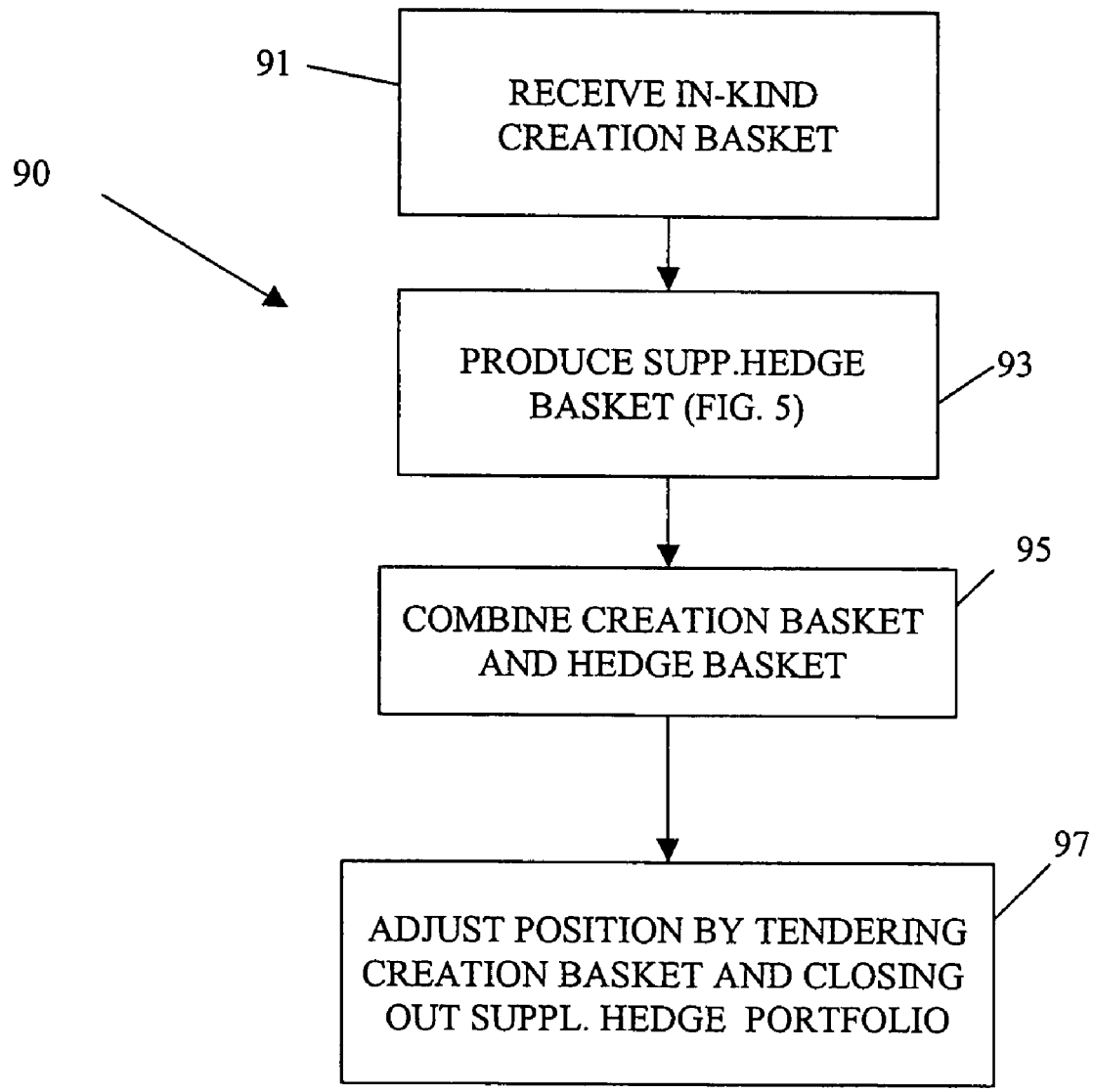
FIG. 6 is a flow chart of an alternative hedging process for an traded actively managed fund.

Referring to FIG. 6, a variation of the stand-alone hedging portfolio described above is shown. This process 90 receives 91 an in-kind creation basket that is posted or provided by the fund or instrument that the trader trades. The trader would produce 93 a supplemental hedging portfolio or basket as described above. The trader thus would include this supplementary hedging portfolio as an add-on portfolio to be used in conjunction with the in-kind creation basket posted by the fund. In this case, the trader combines 95 a position in the creation (redemption) basket with a position in a supplementary hedge basket. At some point during trading, the trader could tender 97 (or receive) the creation (redemption) basket to adjust its fund share position at the end of the day and close out the supplementary hedge portfolio at the close.

To explain this process in more detail, a creation basket for an actively managed fund may not exactly match the portfolio and thus, it may not be suitable as a stand-alone hedging basket. The creation basket may be different from the fund portfolio to various degrees and, thus, the creation basket may not closely track the actively managed fund on an intra-day basis. Thus, rather than the trader using the creation basket alone as a hedging instrument, the trader could use the factor portfolio process described above or a combination of the creation basket and the supplementary hedging basket produced by the factor portfolio process, because the trader may need a creation basket at the end of the day to exchange for the fund shares. The trader would need to close out the supplementary hedging basket in a very low cost manner perhaps using market-on-close-orders. This is another feature provided to traders for use in hedging their positions.

These features are designed to make markets tighter (i.e., lower spreads between bid and asked prices for quotes or limit orders) and to provide services, which encourage people to list their funds on the exchange. To the extent that an intraday net asset value proxy is determined, it helps the specialist and other market participants to evaluate the appropriate price for shares that the specialist buys and sells over the course of the day. The investor can be confident that the market is fair and that bid and offer prices tightly bracket the intraday net asset value proxy. The intraday NAV proxy process described above processes such data for a traded, actively managed fund that is based on an actively managed fund for which the actual positions in the actively managed fund are not known outside of the investment advisor/management organization.

The hedging portfolio reduces the risk that the market maker, specialist or trader takes because there is a basket, that is the hedging portfolio, that closely approximates the behavior of the actively managed traded fund on the long side of the market when the trader shorts the shares or on the short side when the trader sells the hedging portfolio (short) to hedge a long position in the fund shares.

Production of the hedging portfolio facilitates risk management for the trader by replicating the risk as closely as possible to the risk that the trader is accepting. The hedging portfolio minimizes but does not eliminate tracking error. The hedging portfolio enables the specialist or market maker to hedge its portfolio efficiently at a lower cost than they could do with no more than the fund's last reported portfolio because that portfolio could easily be six months or more out of date.

The factor model provides the specialist or market maker with a portfolio of instruments, securities, etc. that will enable the specialist to create a hedge that will track the basket of securities that make up the actively managed fund portfolio without the specialist ever knowing what specific securities are in the actively managed fund.

The encrypted information is used to extract factors that affect the value of the securities that make up the actively managed fund. The exact process will depend on the type of factor model used. Assume that a Sharpe-type factor model is used. The Sharpe model will take an existing portfolio back in time (not the actual portfolio that was in the fund in the past because the actual portfolio may change from day to day, but the actual portfolio at the prior day's close as if that portfolio had been in the fund all along).

Referring back to FIG. 5, the process 80 takes a potential hedging portfolio of, e.g., 100 instruments, and executes a computer implemented model to determine weights, if any, in each of these instruments to give the best possible tracking of the actual actively managed fund portfolio. The specialist, market maker or other market participant who needs to hedge a position is provided with the appropriate weighted portfolio of instruments, which would have tracked that actual actively managed fund portfolio very closely or to a specific degree of tolerance or tracking error over the prior period. This information is used by the specialist market maker or other market participant to produce a hedging portfolio to offset the risk of shorting the fund shares when there is more demand for the traded actively managed fund shares then the traders can supply from inventory, or going long the traded actively managed fund shares and short the hedging basket when there is less demand for the traded actively managed fund shares and the traders must absorb traded actively managed fund shares into inventory.

Thus, the net asset value proxy calculation and the portfolio of hedging instruments provide additional information for specialists and market makers on the floor and others to enable them to make better markets. While this information may not be disseminated to market makers in other markets due to economic, regulatory and liability factors, the existence of the information should make these markets better (deeper and with a tighter spread) as well.

Unlike a synthetic hedging portfolio that is based on historical closing NAV while keeping the contents of the portfolio confidential, the hedging basket, to be effective, must be based on the current portfolio. In the synthetic hedging portfolio, only the closing NAV calculations are used. Back over a period of time, these calculations become less relevant to the current contents of the portfolio. Furthermore, to the extent that the portfolio changes in a material way, net asset value calculations from even a few days earlier may give a misleading picture of the investment characteristics of the portfolio.

Figure 7:
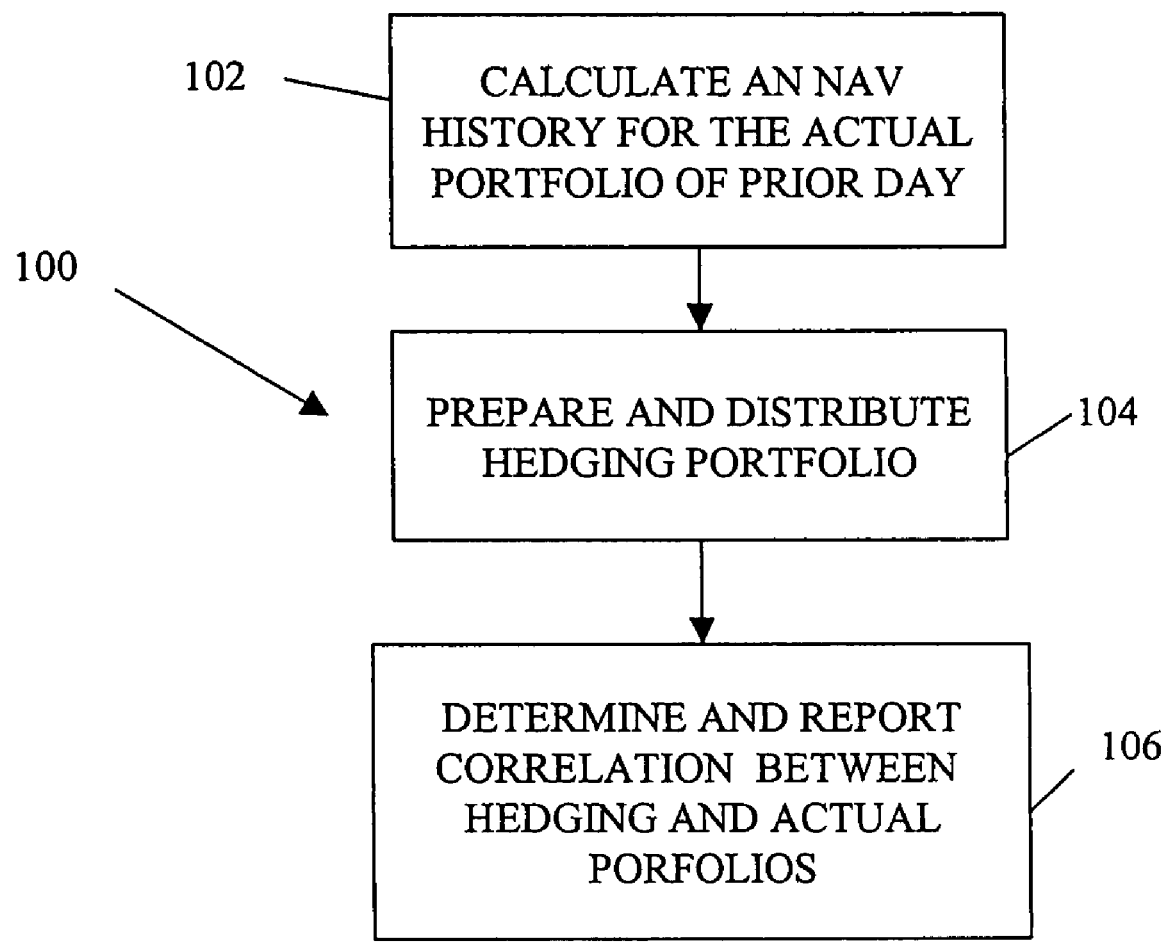
FIG. 7 is a flow chart showing an alternative process for producing a hedging portfolio for a traded actively managed fund.

Referring to FIG. 7, an alternative process 100 for a market maker, specialist or other market participants to hedge a portfolio is shown. The alternative process calculates 102 an NAV history for the actual portfolio (as of the previous day's close). The process 100 prepares and disseminates 104 a hedging portfolio for the use of the specialist, market makers and, perhaps, arbitrageurs and others interested in creating a hedging position. The process 100 could be executed by the actively managed fund custodian or advisor or by the exchange using an encrypted portfolio much the same way that the NAV proxy calculation is determined. The process 100 would price that portfolio using a price database. As long as the instruments to be evaluated and included in the recommended hedge and the techniques used are known in advance, it should be possible to reduce tracking error. The entity that prepares and disseminates the hedging portfolio reports 106 a correlation or the tracking error of the hedging portfolio with the fund portfolio. In order to determine tracking error, the entity needs actual knowledge of the portfolio as it exists at the previous night's close.

In general, such a hedging portfolio would be fairly constant, unless and until there was a material change in the contents of the fund portfolio, at which time the hedging portfolio would probably change. Changes in the hedging portfolio could result from a broad change in the underlying portfolio, e.g., a shift from technology stocks to financial stocks. Disseminating information on specific portfolio changes might not be acceptable to the advisor. Rather, the advisor may choose to accept the cost of not providing a close tracking hedging portfolio, recognizing that the cost will include wider spreads and, probably, less liquidity in fund shares in the market.

The hedging portfolio, a variation on full dissemination of the portfolio, will be acceptable to many fund advisors. A participant who was considering creating or redeeming shares would look at a creation or redemption basket as part of the hedging position. The rationale for the redemption basket is that if the market maker or arbitrageur sought to redeem the basket, the portfolio he would receive would be for the redemption basket and would in many cases be different from the actual fund portfolio and from the creation basket. To the extent that the creation or redemption basket does not match the fund portfolio, the advisor or fund manager can add additional instruments (i.e., the supplementary hedging basket to the creation or redemption basket) to improve tracking. The additional instruments could be provided to improve the tracking of the entire hedging position. The additional instruments could improve tracking for various market participants, particularly those engaged in arbitrage and market making, will help improve the quality of their hedges, and should have the highly beneficial effect of reducing the bid-asked spread.

This alternative approach to producing a synthetic portfolio using a factor model or other technique has several advantages. The synthetic hedging portfolio might include a mixture of futures contracts, options and/or a number of stock positions that collectively mirror the historic behavior of the actual fund portfolio. Using any of several types of factor models, the buyer can develop a hedging portfolio that will be more highly correlated with the fund than any single futures contract.

Figure 8:
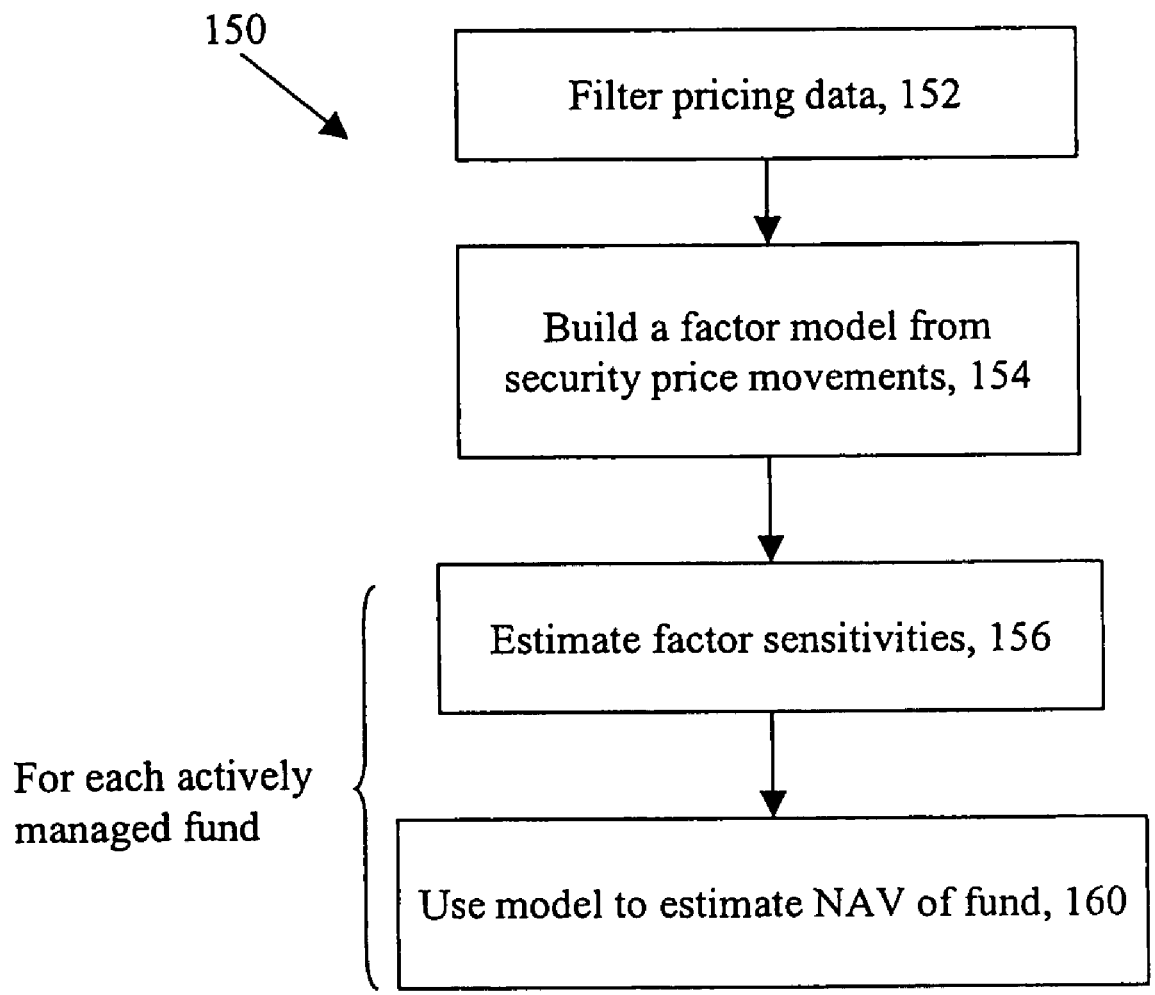
FIG. 8 is a flow chart showing a preferred process for producing a hedging portfolio for a traded actively managed fund.

Referring to FIG. 8 a preferred example of a process 150 to construct a hedging portfolio and accurately price intra-day a traded actively managed fund is shown. The factor analysis process 150 is based on multi-factor risk models produced using statistical factor analysis called principal component analysis. Principal component analysis is a classical multivariate technique that originated with Pearson (1901): *On Lines and Planes of Closet Fit to Systems of Points in Space*, Philosophical Magazine, series 6, 2, 559-572. More recent reference textbooks on PCA are given in '*Common Principal Components and Related Multivariate Models*' by B. Fleurie (Wileys, 1988) and '*Market Models: A Guide to Financial Data Analysis*' by C. Alexander (Wileys, 2001).

The statistically derived multi-factor risk model is used to estimate the intraday approximation of the net asset value (NAV) of an actively managed fund to accuracy within a normal bid-ask spread for trading the fund. A market maker, specialist or other market participant can also use the model to construct a hedge portfolio to hedge positions taken during the trading day.

The process 150 filters 152 pricing data and examines 154 statistical factors by constructing a model that will be described in FIG. 10. The process 150 uses the model to estimate 156 factor sensitivities, i.e., weights for factors in a model for a particular actively managed fund. These factors and factor sensitivities are used to model or estimate the NAV intra-day for the actively managed fund. Thus, the process 150 builds a model of security price movements without pre-specifying factors. Using a statistical modeling approach, the process 150 analyzes data to build the model from, e.g., security price movements over a period of time for a group of securities.

Figure 9:
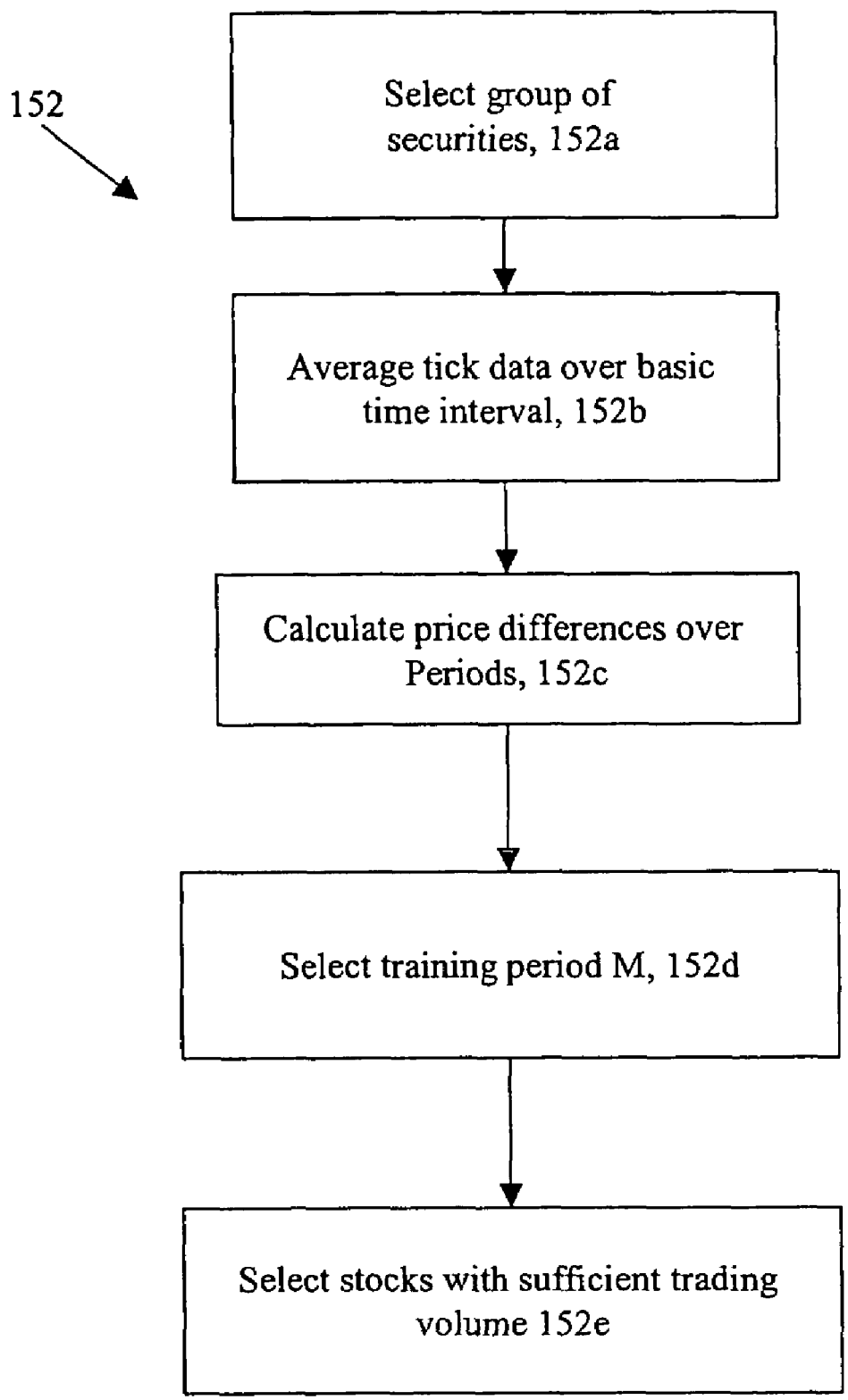
FIG. 9 is a flow chart showing data filtering process.

Referring to FIG. 9, a process 152 to filter data is shown. The process 152 can use 152a a pre-selected group of securities to build a model as will be described below. The initial grouping can be based on some sort of fundamental information, e.g., industry or sector grouping. The process 152 filters historical prices for securities that are included in the model. For example, the process 152 can use pricing tick data averaged 152b over some basic time interval. For example, the pricing data can be derived from the geometric average price for each stock during each 60-second interval. The model uses 152c data calculated as log price differences over N-minute periods using the last recorded price in each N-minute period. For example, for N=40 the model can use 152c the last recorded price in each 40 minute span of trading. The value of N can be tailored to best suit each particular fund's requirements.

The model is also trained 152d using a training period over the most recent M returns, where M is large enough to avoid degrees of freedom problems and small enough so that model parameters will accurately reflect market conditions. 'Degrees of freedom' refers to the estimation of model parameters, which is based on historical data. In general, to avoid 'degrees of freedom' problems, the process uses more data points (returns) than parameters to estimate.

From the list of stocks, those stocks with sufficient trading volume are used 152e in the model. The process can set a data density threshold $\chi$. That is, for example stocks that have traded in at least, e.g., $\chi$=50% of the 40-minute time buckets used to build the model are considered for selection. The model can use time periods that avoid turbulence associated with the open and close portions of the market.

Figure 10:
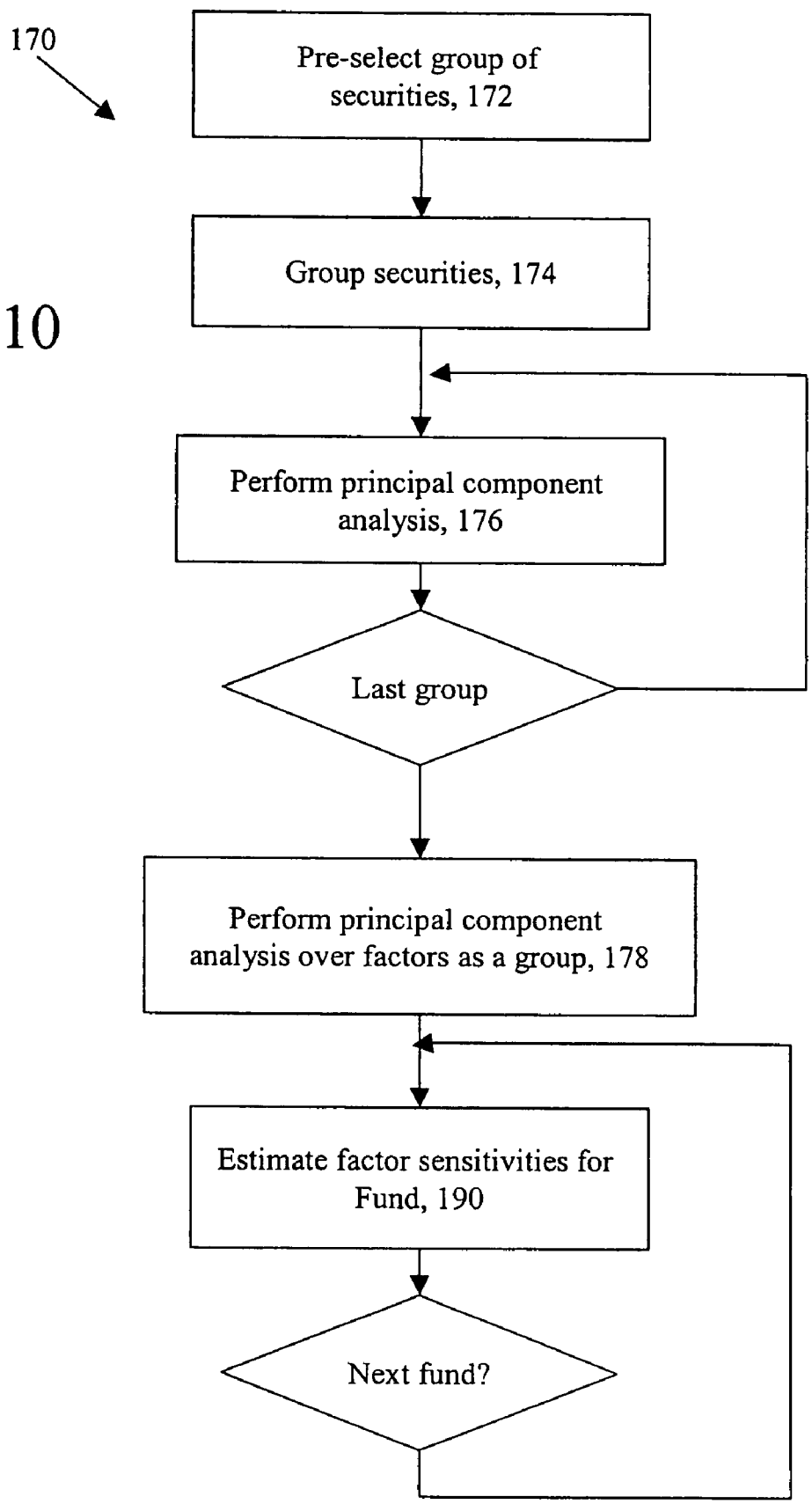
FIG. 10 is a flow chart showing a modeling process.

Referring to FIG. 10, process 170 builds individual risk models for each actively managed fund that will be traded intra-day. These models are used so that the actively managed fund managers do not have to disclose their holdings to the market. However, when building these models it is important to note that there is much information that is publicly known or which could be disclosed about the actively managed fund.

The process uses 172 a list of securities from which to produce factors. One type of list is a list of the securities that the fund would contemplate holding. With such a list the model for the particular actively managed fund can be limited to holding securities from that list of securities. Also, the list can be a "followed list" of securities. Such a list could be requested from the portfolio manager in order to produce an intra-day traded version of that actively managed fund. Alternatively, a followed list can be derived based on the actual holdings over time for the fund possible combined with stocks from a broad market index, e.g., the Russell 1000 Index®.

The process 170 can initially group the securities 174 into groups of securities for which there is some basis to believe that their prices might move together. The process 170 may find such groups by grouping securities together according to industry.

For each industry or group, the process 170 takes the filtered N-minute returns over stocks over the last, e.g., 30 days, and performs 176 a principal component analysis (PCA) over some percentage of variation (y %) that will be explained by the principal component factors. Depending on this choice, a subset of the principal components will be used as the factors for the particular industry. For example, the process can specify enough principal components to capture, e.g., 40-95% of the variation in each industry. More specifically about 60% of the variation in each industry can be used as a representative amount. The PCA process 176 will reduce the number of component factors to a number of factors that represent about or at least 60% of the variation for the particular industry. For example, sufficient principal components can be used to capture 95% of the variation, but likely not more, because the last 5% of the variation is probably noise. Principal component analysis involves computing eigenvectors and eigenvalues of a correlation matrix of the returns. The computed correlation matrix can be equally or exponentially weighted with the weighting being a parameter in the model. The values can range from 1 to less than 1. A value of 1 corresponds to a linear weighting.

This grouping process 176 is done for each of the groups, i.e., industries providing a total number of groups of n1+n2+ . . . +ni factors, which are chosen to capture the 60% variation in each industry or group due to systematic effects.

The securities in each of the groups of securities have prices that move similarly, because the prices of the securities all tend to react similarly to some underlying, undiscovered set of economic factors. The process 170 does not need to actually identify those factors for the group because the factors are captured in the price movement of the group. The process 170 uses the groups to track the price movements in the actively managed fund. For the actively managed fund the process 170 will not generally know the actual composition of the fund. As mentioned above, some information is known about the actively managed fund. For example, the net asset value (NAV) at the close of the prior business day is known. There is also likely some knowledge concerning the risk characteristics of the actively managed fund relative to the factors in the model of the particular actively managed fund.

In another embodiment, at this stage the process 170 can further reduce the number of securities, i.e., factors by taking into account a cross-industry group correlation. The process 170 performs 178 a further PCA on the factors, and some number K (another parameter, typically set to less than 100) of final factors $P_1, \ldots P_K$ are extracted. These K factors are used to estimate the NAV intraday during the following trading day.

Figure 11:
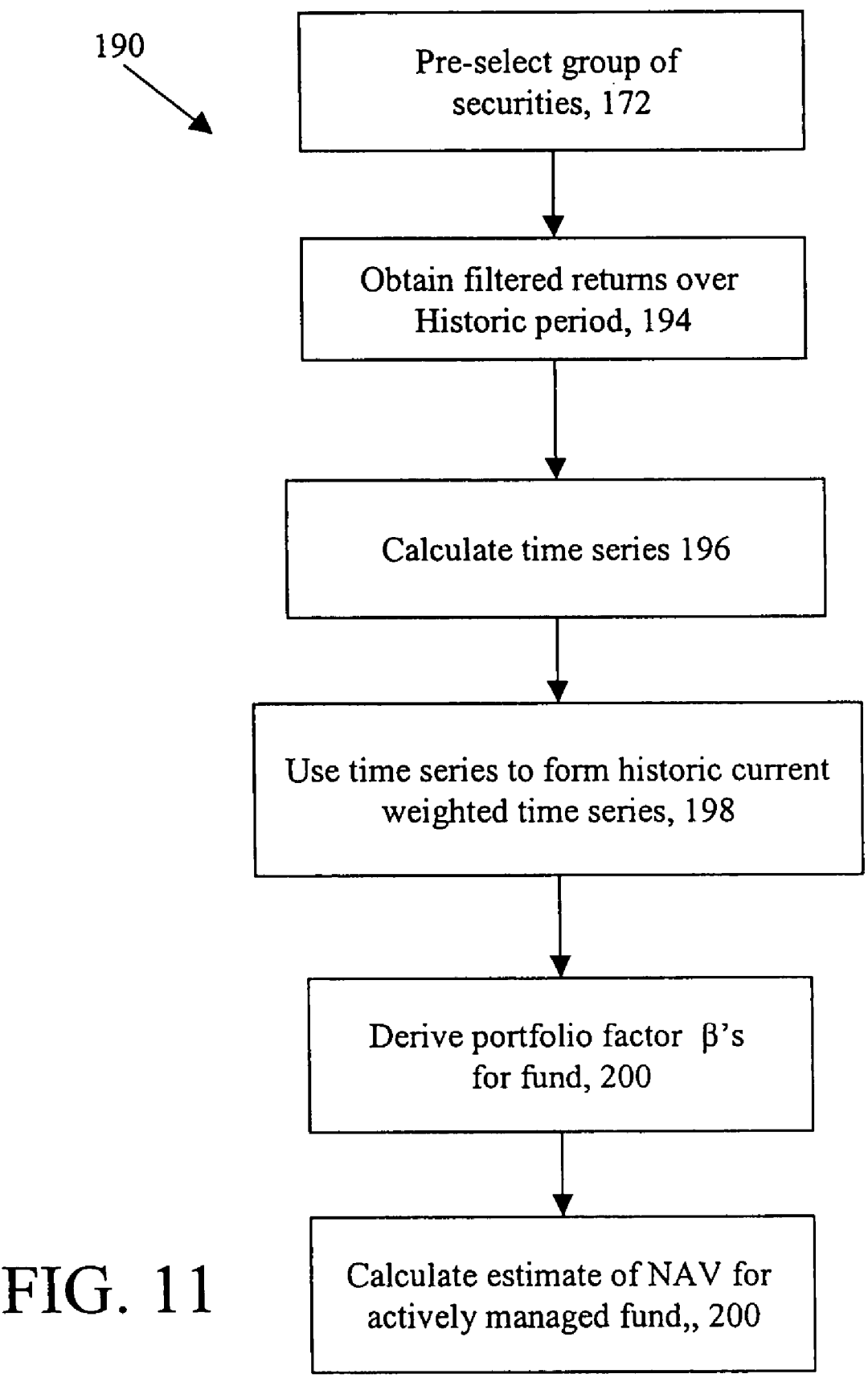
FIG. 11 is a flow chart showing a process for estimating factor sensitivities for estimating an NAV of a traded actively managed fund.

The process 170 uses the securities from either the single level or multi level grouping actions 176, 178 to estimate factor sensitivities for a particular actively managed fund in order to estimate intraday the NAV of the actively managed fund on a particular day, as described in FIG. 11.

Exemplary numbers of manageable factors can be 100 to 250 factors more preferably 80 to 150 and still more preferably 80-120 or so factors that capture some portion, e.g., 60% of the price movement. While the process can be constructed to take all of the factors and explain 100% of the variation, this is not necessary preferred because in high frequency data of this type, much of the historic variation can only be described as "noise." The process tries to capture the most important systematic sources of variation that are likely to continue during the trading day, rather than small idiosyncratic stock price variations that are not due to market fundamentals and robust correlations.

The two-stage statistical factor analysis process 170 uses statistical factor analysis to develop group-by-group factors. It also uses statistical factor analysis over a second pass to reduce factors to a manageable number of factors $P_1, \ldots P_K$ (which are already cast in the form of returns).

Referring to FIG. 11 a process 190 for estimating the factor sensitivities is shown. The process 190 estimates 192 the factor sensitivities for a particular actively managed fund. These factor sensitivities or (weightings) are required for estimating the intraday NAV of the particular actively managed fund on a particular day. The process obtains 194 the filtered actively managed returns over a historic data period (e.g. 40-minute returns over the last 30 working days). The process calculates 196 a return time series "$R_t$" for the actively managed fund using the difference 'price at time t' minus 'price at time t−1' expressed as a proportion of the price at time t−1. The process 190 uses 198 the historic 40-minute time series on each stock to form an historic 'current weighted' time series of synthetic fund returns $R_t$.

The process 190 derives 200 the portfolio factors $\beta_1, \beta_2 \ldots \beta_k$ for use on current day using the following least squares regression over the same historic data period:

$$R_t = \Sigma_{j=1, \ldots k} \beta_j P_{j,t} + \epsilon_t \tag{1}$$

The process 190 uses 202 the regression in pricing the actively managed fund. It should be noted that the estimated factor sensitivities $\beta_1, \beta_2 \ldots \beta_k$ remain constant throughout the next trading day. However, the returns to the factors $P_1, \ldots P_K$ will change each time a stock price changes. Each factor is a known linear combination of individual stock returns, so that as the stock prices change during the following day, the returns to these factors can be continuously updated. Thus the return on the actively managed fund at any time $\tau$ during the following day is calculated using the equation $$R_\tau = \Sigma_{j=1, \ldots k} \beta_j P_{j,\tau} \tag{2}$$

where $P_{j,\tau}$ is the return on factor j to time $\tau$.

Equation 1 represents the theoretical statistical model whereas equation 2 represents the actual statistical model.

Equation 1 includes a term that represents a statistical error because the returns RT, are random variables. Whereas, in a classical statistical model the variables that explain the returns are either not assumed to be random or even if they are random the variables are not assumed to precisely explain the returns. So the statistical model is represented with the error factor $\epsilon_t$. In Equation 2 the factors are actual numbers and thus the error factor is not used.

The first equation is used to estimate the sensitivities and the second equation, which is used to price the model has estimated sensitivities as actual numbers.

The process can develop a time series on the $\epsilon_t$, which are observations on $\epsilon_t$ variable from which diagnostics like the error estimate can be computed e.g., using a standard deviation of the errors or the root mean square error, and so forth. Another way of looking at the error factor is that suppose the model was accurate, but historical pricing had noisy components. The error factor would be the noise over some particular period in the past, but since equation 2 is used to forecast the noise would not be present and hence the error factor would not appear in equation 2. While there is also some noise with forecasting there is no way of forecasting that type of noise. The diagnostics mention above can help establish whether the noise really is random noise, or whether there is a further pattern to it that should be modeled and captured.

Alternatively, these linear combinations of assets can be combined once again, using the factor sensitivities ($\beta$) as weights, into a single 'tracking' portfolio.

The model is updated periodically, e.g., overnight. Even if the parameter choices (number of returns used in the model N or K, data density threshold $\chi$, number of factors in the first stage (based on "percentage of variation (y %)") and second stage "K", and so forth) are unchanged, the number and the construction of the factors themselves will change, as will as the factor sensitivities.

The process 190 can be performed for each actively managed fund. The statistical analysis tries to get to the correlation structure underlying price movements between the actively managed fund and the groupings of stocks. The statistical factors represent how unidentified factors affect the way in which the price of the actively managed fund portfolio changes during a trading day.

A number of different parameters are chosen to run the model including the frequency of returns (N), the 'training period' (M) the data density threshold ($\chi$ %), an optional exponentially weighted on the data and appropriate smoothing constant, variation should be explained at the group, i.e., industry level (y %), and the type of groupings. Also the number of factors used in the final model (K) is selected.

Diagnostics such as sample statistics (mean, standard deviation, skewness and excess kurtosis) on a 'spread' between the estimated NAV and the actual NAV can be determined as well as a relative root mean square error (RMSE) that compares the size of the pricing error from the model, with the error that one would obtain from a simple model that just quotes the actively managed fund price as the same as the closing price at the end of the previous day. A graphical comparison of the spread between the estimated NAV and the actual NAV may also be used.

A typical test is based on a 'testing period' of many days during which the parameter choices are held constant, although the model is of course re-estimated every day as described above.

Other Embodiments

Other embodiments are within the scope of the following claims.

What is claimed:

1. A method of estimating an intra-day approximation of the net asset value (NAV) of actively managed exchange traded funds comprising the steps:
    grouping securities into groups of securities for which there is some basis to believe that their prices might move together; and for each group
    performing a principal component analysis (PCA) over some percentage of variation (y %) to arrive at a subset of the principal components as the factors for the particular group using a computer;
    estimating an intra-day approximation of NAV of the actively managed fund of a particular day by estimating factor sensitivities of the subset of factors in each of the groups for a particular actively managed fund using a computer, wherein the intra-day approximation of NAV of the actively managed fund does not reveal the assets of the actively managed fund portfolio to an investor who trades shares of the actively managed fund.

2. The method of claim 1 wherein the variation is in a range of about 40-95% of the variation in each group.

3. The method of claim 2 wherein principal component analysis involves computing eigenvectors and eigenvalues of a correlation matrix of the returns.

4. The method of claim 1 further comprising:
    performing a further principal component analysis on the factors to arrive at some number of final factors to estimate the NAV price during the following trading day.

5. A computer readable medium storing a computer program product for estimating the net asset value (NAV) of actively managed exchange traded funds, which are traded intra-day comprising instructions, which are executed by a computer and cause the computer to:
    group securities into groups of securities for which there is some basis to believe that their prices might move together; and for each group
    perform a principal component analysis (PCA) over some percentage of variation (y %) to arrive at a subset of the principal components as the factors for the particular group;
    estimate the NAV of the actively managed fund on a particular day by estimating factor sensitivities of the subset of factors in each of the groups for a particular actively managed fund, wherein the factor sensitivities of the subset of factors in each of the groups for the particular actively managed fund do not reveal the assets of the actively managed fund portfolio to an investor who trades shares of the actively managed fund.

6. The computer readable medium storing a computer program product of claim 5 wherein the variation is in a range of about 40-95% of the variation in each group.

7. The computer readable medium storing a computer program product of claim 5 wherein principal component analysis involves computing eigenvectors and eigenvalues of a correlation matrix of the returns.

8. The computer readable medium storing a computer program product of claim 5 further comprising instructions to:
    perform a further principal component analysis on the factors to arrive at some number of final factors to estimate the intra-day NAV proxy during the following trading day.

9. An apparatus comprising:
a processor;
a computer readable medium storing a computer program product for estimating an intra-day approximation of the net asset value (NAV) of actively managed funds, which are traded intra-day, with the computer program product comprising instructions causing cause the processor to:
group securities into groups of securities for which there is some basis to believe that their prices might move together; and for each group
perform a principal component analysis (PCA) over some percentage of variation (y %) to arrive at a subset of the principal components as the factors for the particular group;
estimate the intra-day approximation of NAV of the actively managed fund on a particular day by estimating factor sensitivities of the subset of factors in each of the groups for a particular actively managed fund in order to estimate the intra-day approximation of NAV of the actively managed fund on a particular day, wherein the factor sensitivities of the subset of factors in each of the groups for the actively managed fund do not reveal the assets of the actively managed fund portfolio to an investor who trades shares of the actively managed fund.

10. The apparatus of claim 9 wherein the computer program product accounts for variation in a range of about 40-95% of the variation in each group.

11. The apparatus of claim 9 wherein the computer program product uses principal component analysis that involves computing eigenvectors and eigenvalues of a correlation matrix of the returns.

12. The apparatus of claim 9 wherein the computer program product further comprises instructions to:
perform a further principal component analysis on the factors to arrive at some number of final factors to estimate the intra-day NAV proxy during the following trading day.

13. An actively managed fund that is traded intra-day between buyers and sellers comprising:
shares or derivative instruments corresponding to an interest in the actively managed fund, with the shares or derivative instruments being traded based on a hedging basket of securities derived by applying a principal component analysis to a group of securities to select a subset of the group and weightings for the subset to account for a percentage of variation (y %) of actively managed fund, wherein the hedging basket does not reveal the assets of the actively managed fund portfolio.

14. The actively managed fund of claim 13 further comprises:
the shares or derivative instruments corresponding to an interest in the actively managed fund further traded based on:
pricing of the shares or derivative instruments as determined between buyers and sellers of shares in or derivative instruments of the fund.

15. The actively managed fund of claim 13 wherein the shares or derivative instruments corresponding to an interest in the actively managed fund are further traded based on:
a determined intra-day net asset value proxy for the fund that is derived based on modeled returns on the actively managed fund calculated using the equation:

$$R_\tau = \sum_{j=1,\ldots,K} \beta_j P_{j,\tau}$$

where $P_{j,\tau}$ is the return on factor j to time $\tau$.

16. The actively managed fund of claim 13 wherein the hedging basket is derived based on modeled returns on the actively managed fund calculated using the equation:

$$R_\tau = \sum_{j=1,\ldots,K} \beta_j P_{j,\tau}$$

where $P_{j,\tau}$ is the return on factor j to time $\tau$.

* * * * *

UNITED STATES PATENT AND TRADEMARK OFFICE
CERTIFICATE OF CORRECTION

| | |
|---|---|
| PATENT NO. | : 7,574,399 B2 |
| APPLICATION NO. | : 11/974468 |
| DATED | : August 11, 2009 |
| INVENTOR(S) | : Weber et al. |

Page 1 of 1

It is certified that error appears in the above-identified patent and that said Letters Patent is hereby corrected as shown below:

In the specification:

Column 1, line 4, insert -- This application is a divisional of U.S. Patent Application Serial No. 10/174,505, filed on June 17, 2002, now U.S. Patent No. 7,571,130. --

Signed and Sealed this

Twenty-fifth Day of May, 2010

David J. Kappos
*Director of the United States Patent and Trademark Office*